United States Patent
Mendonsa et al.

(10) Patent No.: US 12,387,753 B1
(45) Date of Patent: Aug. 12, 2025

(54) MULTIDIMENSIONAL OPTICAL STORAGE MEDIA HAVING LIGHT CONFINEMENT LAYERS AND READING METHODOLOGY THEREFOR

(71) Applicant: SEAGATE TECHNOLOGY LLC, Fremont, CA (US)

(72) Inventors: Riyan Alex Mendonsa, Edina, MN (US); Aditya Jain, Minneapolis, MN (US); Joachim Walter Ahner, Livermore, CA (US)

(73) Assignee: Seagate Technology, LLC, Fremont, CA (US)

( * ) Notice: Subject to any disclaimer, the term of this patent is extended or adjusted under 35 U.S.C. 154(b) by 0 days.

(21) Appl. No.: 18/754,374

(22) Filed: Jun. 26, 2024

(51) Int. Cl.
| | |
|---|---|
| *G11B 7/00* | (2006.01) |
| *G11B 7/0045* | (2006.01) |
| *G11B 7/013* | (2006.01) |
| *G11B 7/24044* | (2013.01) |
| *G11B 7/24067* | (2013.01) |

(52) U.S. Cl.
CPC ...... *G11B 7/24044* (2013.01); *G11B 7/00456* (2013.01); *G11B 7/013* (2013.01); *G11B 7/24067* (2013.01); *G11B 2007/0013* (2013.01); *G11B 2007/0133* (2013.01)

(58) Field of Classification Search
CPC ......... G11B 7/0079; G11B 7/135; G11B 7/26; G11B 7/00
USPC ........................................................ 369/103
See application file for complete search history.

(56) References Cited

U.S. PATENT DOCUMENTS

| | | |
|---|---|---|
| 10,236,027 B1 | 3/2019 | Georgiou |
| 2014/0050064 A1 | 2/2014 | Nakahara |
| 2014/0219072 A1* | 8/2014 | Singer .................. G11B 7/0079 |
| | | 369/275.3 |
| 2018/0154572 A1 | 6/2018 | Richter |

FOREIGN PATENT DOCUMENTS

| | | |
|---|---|---|
| WO | WO 2019/158910 A1 | 8/2019 |
| WO | WO 2020/109767 A1 | 6/2020 |

OTHER PUBLICATIONS

Wang, "100-Layer Error-Free 5D Optical Data Storage by Ultrafast Laser Nanostructuring in Glass" *Laser & Photonics Review*, 2022, 16, 2100563, 7 pages.

Gu, "Optical storage arrays: a perspective for future big data storage", *Light: Science & Applications*, 2014, 3, 11 pages.

Zhang, "Seemingly Unlimited Lifetime Data Storage in Nanostructured Glass", *Physical Review Letters*, 2014, 112, 033901, 6 pages.

* cited by examiner

*Primary Examiner* — Nabil Z Hindi
(74) *Attorney, Agent, or Firm* — Mueting Raasch Group

(57) ABSTRACT

Described are optical recording media for recording data in voxels, the optical recording media including a plurality of data recording regions for recording the voxels, the data recording regions separated by buffer regions having optical properties such that illumination from a reader that enters one of the data recording regions remains preferentially confined in said one of the data recording regions until being scattered by interaction with one or more of the voxels. Also described are methods for reading the described optical recording media, which include separating the light received from illuminating the voxels based on wavelength, polarization, or other optical properties.

12 Claims, 4 Drawing Sheets

MULTIDIMENSIONAL OPTICAL STORAGE MEDIA HAVING LIGHT CONFINEMENT LAYERS AND READING METHODOLOGY THEREFOR

The disclosure relates to multidimensional optical storage media and techniques for writing and reading multidimensional optical storage media.

SUMMARY

In accordance with various aspects, the present disclosure describes an optical recording medium for recording data in voxels, the optical recording medium including a plurality of data recording regions for recording the voxels, the data recording regions separated by buffer regions having optical properties such that illumination from a reader that enters one of the data recording regions remains preferentially confined in said one of the data recording regions until being scattered by interaction with one or more of the voxels. In certain aspects, the data recording regions include a plurality of recorded voxels. In certain aspects, the buffer regions are configured such that voxels cannot be recorded in the buffer regions.

In certain aspects, the data recording regions and buffer regions are constructed such that illumination from a writer or a reader that enters one of the data recording regions remains preferentially confined in said one of the data recording regions.

In certain aspects, the data recording regions and the buffer regions are arranged in layers through a thickness of the optical recording medium. In certain aspects, the buffer regions have a higher refractive index than the data recording regions. Each of the buffer regions may have a refractive index profile that varies through the buffer region thickness from a first surface to an opposing second surface to have a lower refractive index near the first and second surfaces and to have a higher refractive index in a center portion between the first and second surfaces. The refractive index variation may be discrete or in a gradient.

In certain aspects, each buffer region comprises three layers, the layers arranged such that a higher index of refraction layer is sandwiched by two lower index of refraction layers, each of the layers of the buffer region having a higher index of refraction than that of the data recording regions.

In certain aspects, the data recording regions and the buffer regions are arranged to form recordable areas within a data recording layer, wherein the data recording layer is defined by a plane that is perpendicular to a thickness direction of the optical recording medium.

The present disclosure further describes methods for reading voxels recorded in the described optical recording media. Such methods can include illuminating one of the data recording regions, collecting light scattered from one or more voxels disposed within the one of the data recording regions, separating the light collecting in the collecting step by one or more of wavelength and polarization, and determining a data state of each of the one or more voxels using the light separated in the separating step. To separate the light, optical elements such as dichroic prisms or arranges of lens structures may be used.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
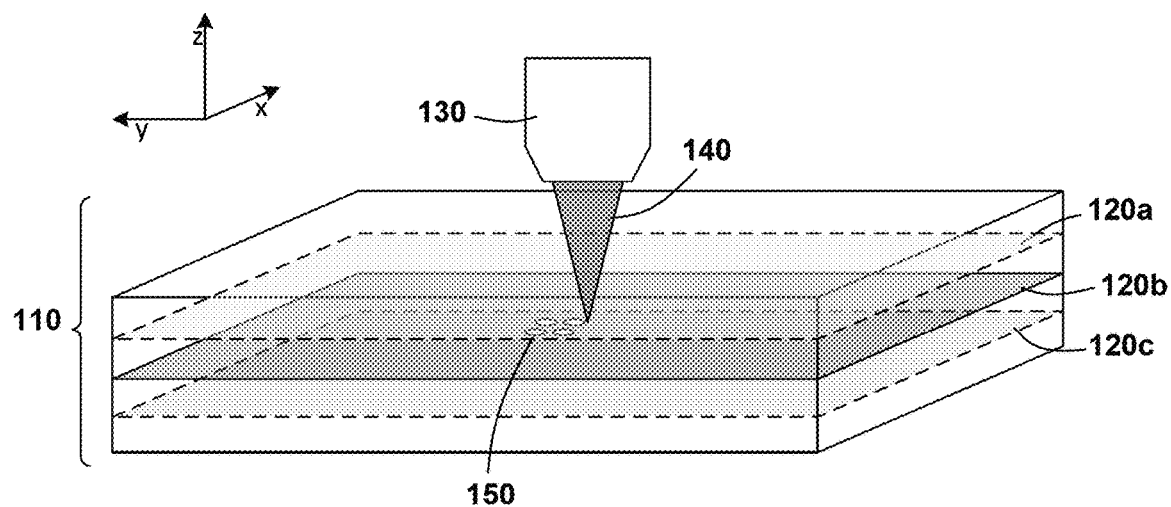
FIG. 1 is a schematic depiction of writing voxels in layers in a 5D optical storage medium.

The present disclosure relates to multidimensional optical storage, and particularly to providing media for multidimensional optical storage that facilitates writing and reading of many layers. Multidimensional optical storage includes so-called 5D optical storage, which is a glass-based data storage technology in which a femtosecond pulsed laser is used to write inside the bulk of a silica glass plate. At the point of focus of the laser in the glass media, light-diffracting voxels are formed. The orientation of the voxels can be controlled by controlling the polarization of the write beam, thus allowing multiple bit recording per voxel. The voxels are read back using polarization sensitive microscopy, which measures the change in polarization that each voxel imparts on the incident light. Data "layers" are formed by writing an array of voxels at a consistent depth within the media. Multiple "layers" of data may thereby be formed in the glass plate by controlling the depth at which the laser is focused. However, as the separation between data layers becomes smaller, confining writing and reading to a single layer becomes more difficult, resulting in the need for more complicated optics, more precision in focusing the write beam, and lower throughput.

These issues are also present in other forms of multidimensional optical storage such as fluorescent-based optical data storage, especially those that utilize multiple wavelengths and dyes. As such, in the present disclosure the term "multidimensional optical storage" refers to optical storage media, and to methods for reading and writing optical storage media, in which the recorded "bits" can be delineated in three dimensions in the media and can further be delineated by polarization or wavelength (for example). As such, the terms "multidimensional optical storage" and "5D optical storage" both refer to the ability to write and read data by optics-based methodologies within all three dimensions of an optical storage medium, and to be able to write and read with multiple bit resolution.

In the present disclosure, it is recognized that it may be useful to delineate regions throughout multidimensional optical storage media for writing and reading data, particularly as data storage densities increase. In particular, the write and read beams may be confined within delineated layers and/or within delineated areas of individual layers, thus more consistently defining where the data resides. By delineating light confinement layers and areas, it may be possible to better resolve individual layers with less complicated optics, to increase the density of data layers in a media plate of given thickness, to increase write and read throughput, and so forth. Current 5D optical media are made of a monolithic glass material having no demarcation between layers in the z dimension (thickness of the media) or between areas within a layer.

5D optical storage media may include glass such as silica glass, certain polymers useful for high-performance optical applications (such polymers may include polycarbonate, PVC, or polypropylene), and other materials such as fluorozirconate, fluoroaluminate, and chalcogenide glasses, or combinations of these. These materials may be infused with dyes, and adhesives may be used to bond multiple layers together.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts writing voxels 150 at a selected depth in a multidimensional optical storage media 110. A writer 130 directs a light beam 140 that is focused at a depth (z-direction) to thereby record an array of voxels 150 all at roughly that same depth. The array of voxels 150 is distributed in the x-y plane. The writer 130 can be scanned across the media 110 by moving the writer 130, by moving the media 110, and/or by scanning the beam 140. By recording arrays of voxels at consistent depths in the media 110, data "layers" can be formed, depicted as data layers 120a, 120b, and 120c. The number of data layers that can be formed in a given thickness of optical media 110, and thus the overall data storage density capability of the media, depends on writing precision, depth of focus of the writing beam, and the ability to resolve each layer during subsequent reading of the media, among other factors.

Figure 2:
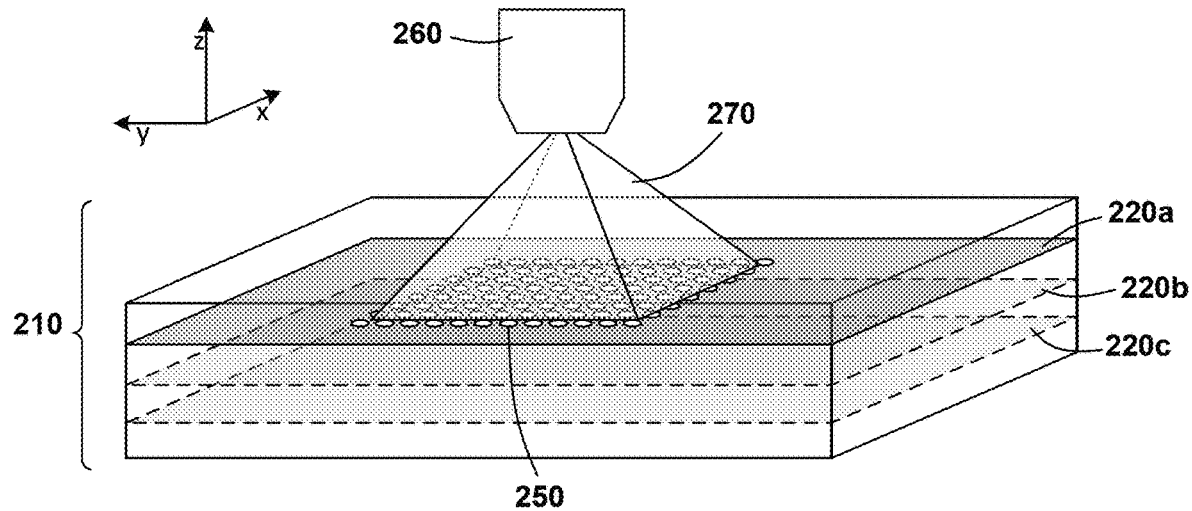
FIG. 2 is a schematic depiction of reading a portion of a voxel data layer in a 5D optical storage medium.

FIG. 2 schematically depicts reading an array of voxels 250 from a data layer 220a formed in an optical storage media 210. Media 210 includes data stored as voxels at multiple depths, depicted as data layers 220a, 220b, and 220c. Multiple voxels over a selected area of a data layer can be read simultaneously, for example by illuminating an area of data layer 220a with reader beam 270, and using detectors included in reader 260 to produce an image of the voxels.

In accordance with various aspects of the present disclosure, optical media may be provided that has a layered construction, thereby defining data storage layers in which light is confined. Because of the layered construction, the media in essence forms waveguides that restrict the dispersal of light and confine the light to the data layer unless the light is dispersed by a voxel. This allows the voxels within a selected data layer to be easily discerned and detected, thereby improving the read throughput. To further improve the read throughput, different wavelengths of light at different phase angles may be used to facilitate the simultaneous detection of phase differences among an array of voxels. For example, three different frequencies of polarized light can be directed toward the media such that each enter the plane of a data storage layer from a different angle.

Figure 3:
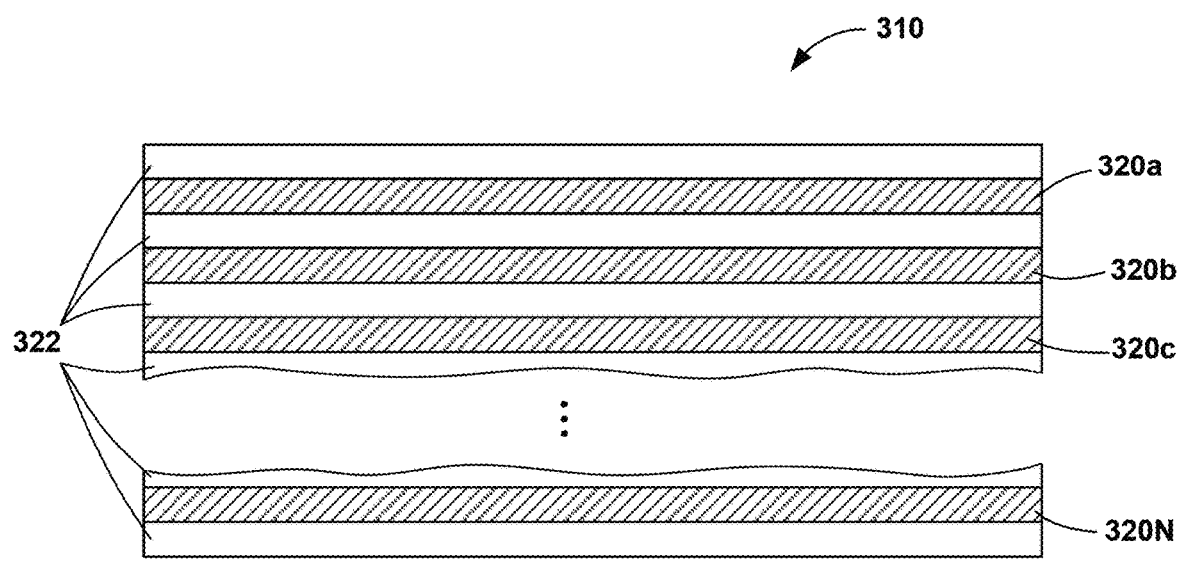
FIG. 3 is a schematic cross-section of a layered optical storage medium in accordance with certain aspects of the present disclosure.

FIG. 3 schematically shows a cross-section of a layered optical storage medium 310 in accordance with certain aspects of the present disclosure. The layered optical storage medium 310 includes defined data storage layers 320a, 320b, 320c, and so forth up to the Nth layer 320N. For example, a storage medium in the format of a plate having an overall thickness of about 10 mm could include many tens or even 100 or more storage layers. The data storage layers are recordable in that a focused femtosecond pulsed laser can be used to create voxels within the data storage layers. Buffer layers 322 are disposed between the data storage layers to clearly define and separate the data storage layers. Buffer layers 322 are transparent to light from the writing and reading beams, and moreover may have optical properties such as a high index of refraction that helps to confine illumination from the writing and reading beams within a data storage layer. This can allow the data storage layers to be spaced closer together with less concern about writing and reading beam illumination being focused on an adjacent data storage layer from what was intended.

Layered optical storage medium 310 may be composed of layers of glass, polymer, or a combination thereof. For example, the data layers may be glass layers with polymer buffer layers disposed between. Multilayer polymer media may be formed by layering of already-formed polymer layers or by co-extrusion of layered films. For silica/glass based systems, pure silica/glass could be used as well as doped silica/glass, for example silica/glass doped with fluorine. Options other than polymers or glass include fluorozirconate, fluoroaluminate, and chalcogenide glasses. The layer thickness in multilayer systems may be about 5 to 50 microns for the data layers and about 7.5 to 75 microns for the buffer layers.

By using media such as layer optical storage medium 310 having defined data storage layers with buffer layers between them, light can be injected into and confined within a desired plane or data layer, thereby illuminating a single layer at a time. As such, during reading the dispersion of light at each of the voxels is more easily detected since the light sheet acts as a single waveguide restricting the dispersal of light and confining it to the data layer, unless and until it is dispersed by the voxel. To further improve the read throughput it is possible to use different wavelengths of light at different phase angles to better detect phase differences between voxels that are read at the same time.

Figure 4:
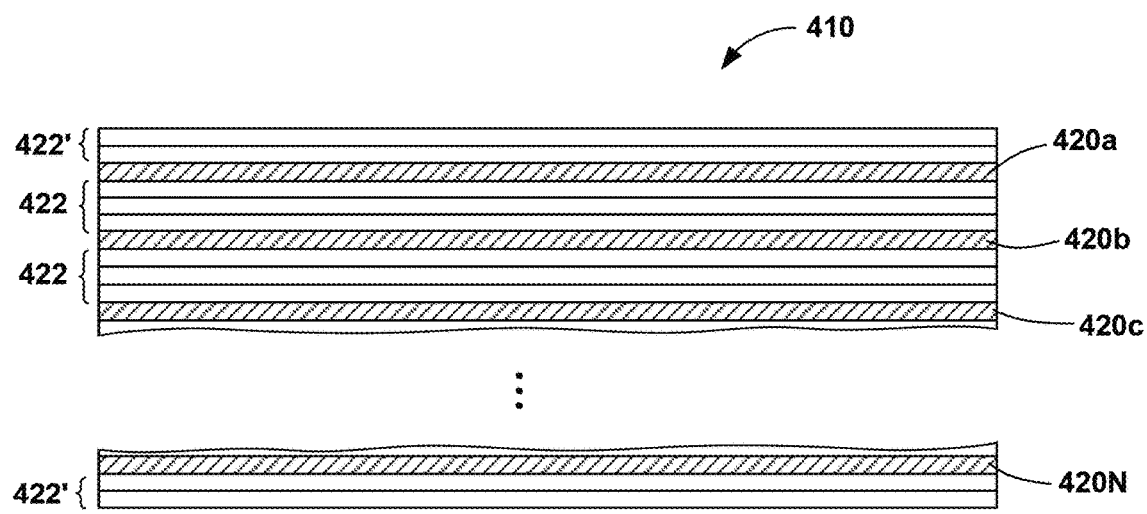
FIG. 4 is a schematic cross-section of another layered optical storage medium in accordance with certain aspects of the present disclosure.

FIG. 4 schematically shows a cross-section of a layered optical storage medium 410 in accordance with certain aspects of the present disclosure. The layered optical storage medium 410 includes defined data storage layers 420a, 420b, 420c, and so forth up to the Nth layer 420N. Between each of the data storage layers is a multilayer buffer 422. The multilayer buffers 422 may each contain multiple "layers" that are defined by changes in or gradations to the refractive index of the buffer material. In FIG. 4, the multilayer buffers 422 are indicated as three layer structures, but it will be recognized that more layers may be used, and that buffers 422 can be constructed so that there is a gradation of refractive index through the buffer 422 rather than sharp transitions or discrete layers. Preferably, each buffer 422 disposed between two data storage layers has a refractive index profile from one data storage layer interface to the other that transitions from a refractive index at a first level that is somewhat higher than the refractive index of the data storage layers, to a refractive index at a second level that is higher than the first level near the middle of the buffer, and back to a refractive index at the first level near the interface of the other data storage layer. At the top and bottom of the optical storage medium 410, truncated buffers 422' are provided. For example, truncated buffer 422' may each have a higher refractive index portion at an exterior surface and a lower refractive index portion (although higher than that of the data storage layers) adjacent to the data storage layer. While FIG. 4 depicts multiple distinct layers in each buffer layer, it will be recognized that the buffer may be implement having a refractive index that varies as a gradient.

Figure 5:
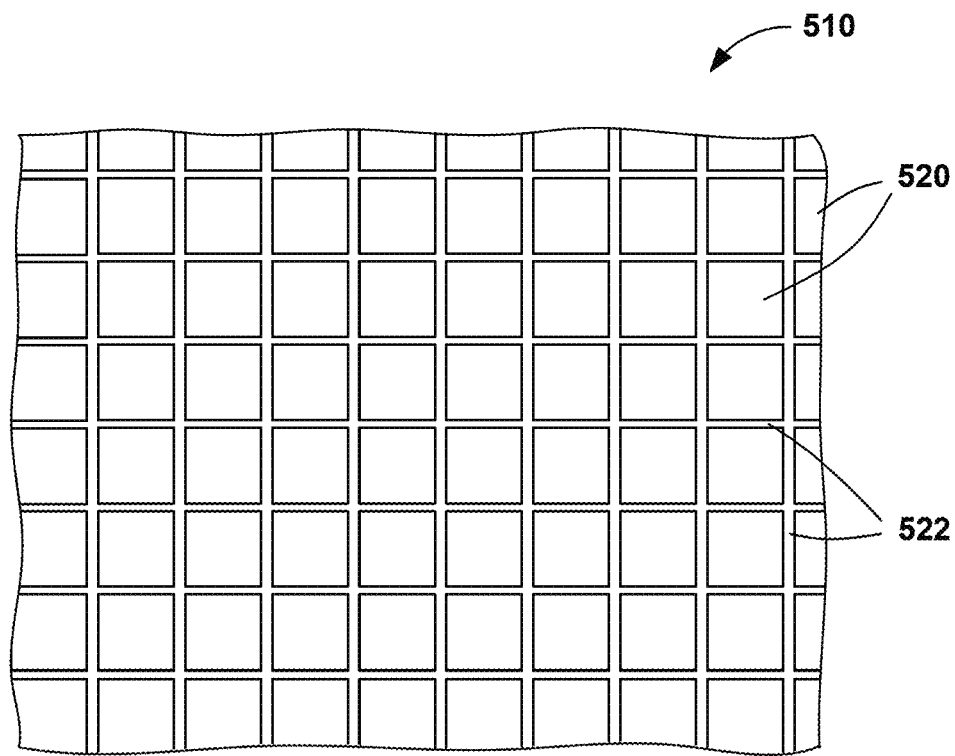
FIG. 5 is a schematic top view of a segmented data storage layer of an optical storage medium in accordance with certain aspects of the present disclosure.

In addition to delineating data storage layers through the thickness of the optical storage media, such as shown in FIGS. 3 and 4, it is possible to delineate data storage areas within a data storage layer, that is in the x-y plane of a data storage layer, by imprinting the data storage layers. FIG. 5 schematically shows a top view of a data storage layer of an optical storage medium 510, which includes recordable regions 520 that are separated by demarcation regions 522. The recordable regions 520 may demark areas for recording single voxels, or may demark areas for recording arrays of voxels. The demarcation regions 522 may be formed as ridges in a manner similar to what is done for other optical recording media such as Blu-ray. The demarcation regions 522 may be formed using a stamping process or other imprinting process, or by other patterning processing including etching and deposition. Moreover, while the recordable regions 520 and demarcation regions 522 are shown to form square-shaped recordable regions 520, the recordable regions may be formed as stripes, as elongated shapes, as rounded shapes, and so forth.

Figure 6:
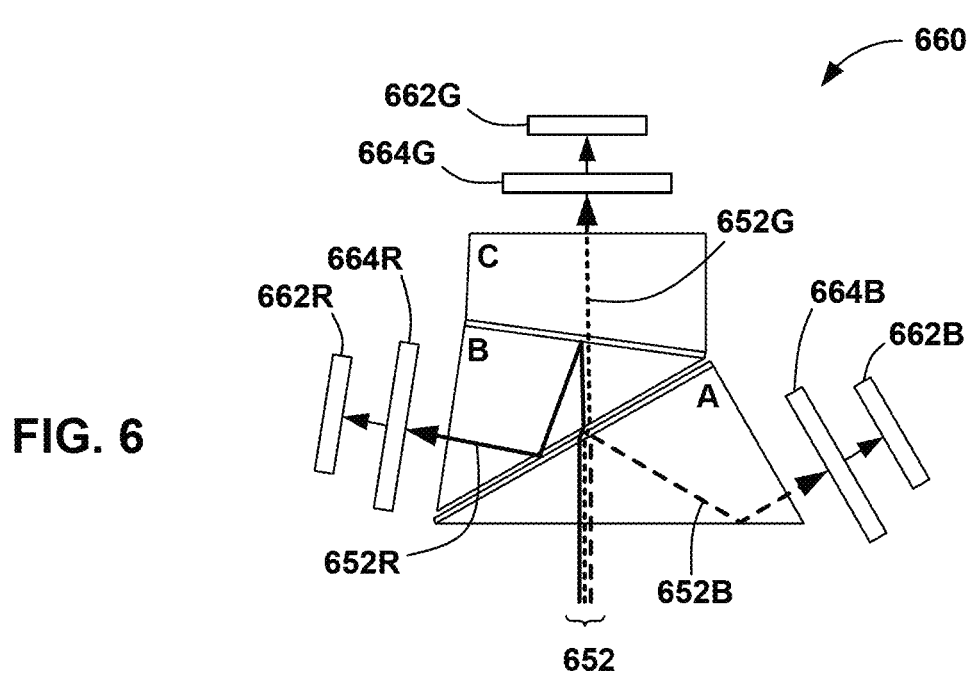
FIG. 6 is a schematic representation of a dichroic prism for use in a reader in accordance with certain aspects of the present disclosure.

FIG. 6 schematically shows a portion of a reader 660 that includes a dichroic prism made up of three prisms labeled A, B, and C. The construction and function of dichroic prisms is well-known. Light 652 received back from scattering off the voxels of a 5D optical storage medium may include different wavelengths and different polarizations. The dichroic prism is used to split the wavelengths of light 652 into different beams, denoted 652R (for red), 652G (for green) and 652B (for blue). A detector is positioned to receive the separated wavelengths of light output by the dichroic prism. For example, beam 652R is directed to detector 662R (optionally through a polarizing filter 664R, beam 652G is directed to detector 662G (optionally through a polarizing filter 664G, and beam 652B is directed to detector 662B (optionally through a polarizing filter 664B. The polarization filters can be used to clean up the detected light, or can be used to further separate the light into different polarization states that can be discerned to thereby store additional data states at each voxel. The detectors may be charge-coupled devices (CCDs) that are routinely used for imaging.

Figure 7:
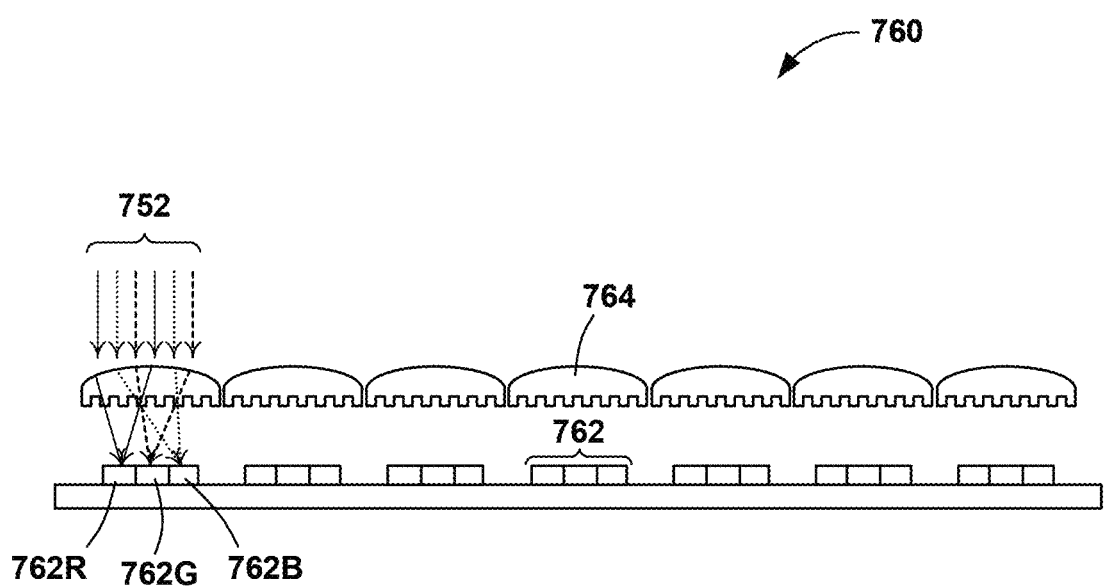
FIG. 7 is a schematic representation of a detector array for use in a reader in accordance with certain aspects of the present disclosure.

While the particular example shown in FIG. 6 may be used to separate between three wavelengths and corresponding polarizations, other setups may be used to detect additional wavelengths and polarizations, as well as retardance values. For example, an array of detector cells can be formed such that each detector cell is sensitive to different wavelengths, polarizations, and so forth at different areas of the cell. The detector cells can then be paired with lens structures that selectively direct the light received from the optical media to the preferentially sensitive areas of the detector cells. These lens structures may be molded, stamped, or otherwise formed on a sheet that overlayed and aligned with the detector cells. FIG. 7 schematically shows an example arrangement of a detector 760 that includes an array of photocells 762 and an array of metasurface lens structures 762 that are aligned to the photocells 762. As shown, each photocell includes three detectors 762R, 762G, and 762B, that are each sensitive to different wavelengths of light that are expected to be received when reading voxels. Light 752 received from illuminating the voxels can be directed by lens structure 764 such that wavelengths are selectively directed to the portions of each photocell 762 that is sensitive to that wavelength. To accomplish this, lens structures 764 may include a combination of a condenser lens to direct the received light toward the photocells 762 and a diffraction grating to separate out and selectively direct the different wavelengths.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. An optical recording medium for recording data in voxels, the optical recording medium comprising a plurality of data recording regions for recording the voxels, the data recording regions separated by buffer regions having optical properties such that illumination from a reader that enters one of the data recording regions remains preferentially confined in said one of the data recording regions until being scattered by interaction with one or more of the voxels, wherein the data recording regions and the buffer regions are arranged in layers through a thickness of the optical recording medium, wherein the buffer regions have a higher refractive index than the data recording regions, and wherein the buffer regions, and wherein each of the buffer regions has a refractive index profile that varies through the buffer region thickness from a first surface to an opposing second surface to have a lower refractive index near the first and second surfaces and to have a higher refractive index in a center portion between the first and second surfaces.

2. The optical recording medium of claim 1, wherein the data recording regions include a plurality of recorded voxels.

3. The optical recording medium of claim 1, wherein illumination from a writer or a reader that enters one of the data recording regions remains preferentially confined in said one of the data recording regions.

4. The optical recording medium of claim 1, wherein the buffer regions are configured such that voxels cannot be recorded in the buffer regions.

5. The optical recording medium of claim 1, wherein the refractive index profile varies as a gradient.

6. The optical recording medium of claim 1, wherein the refractive index profile varies in discrete layers.

7. An optical recording medium for recording data in voxels, the optical recording medium comprising a plurality of data recording regions for recording the voxels, the data recording regions separated by buffer regions having optical properties such that illumination from a reader that enters one of the data recording regions remains preferentially confined in said one of the data recording regions until being scattered by interaction with one or more of the voxels, wherein each buffer region comprises three layers, the layers arranged such that a higher index of refraction layer is sandwiched by two lower index of refraction layers, each of the layers of the buffer region having a higher index of refraction than that of the data recording regions.

8. The optical recording medium of claim 1, wherein the data recording regions and the buffer regions are arranged to form recordable areas within a data recording layer, wherein the data recording layer is defined by a plane that is perpendicular to a thickness direction of the optical recording medium.

9. A method of reading voxels recorded in an optical recording medium comprising a plurality of data recording regions for recording the voxels, the data recording regions separated by buffer regions having optical properties such that illumination from a reader that enters one of the data recording regions remains preferentially confined in said one of the data recording regions until being scattered by interaction with one or more of the voxels, the method comprising:
    illuminating one of the data recording regions;
    collecting light scattered from one or more voxels disposed within the one of the data recording regions;
    separating the light collected in the collecting step by one or more of wavelength and polarization; and
    determining a data state of each of the one or more voxels using the light separated in the separating step,
    wherein the step of separating the light comprises at least one of (i) using a dichroic prism configuration and (ii) using an array of lens structures to selectively direct wavelengths of the light to portions of associated photocells that are sensitive to the selectively directed wavelengths.

10. The method of claim 9, wherein the voxels recorded in the optical recording medium reside only in the data recording regions.

11. The method of claim 9, wherein the data recording regions and the buffer regions are arranged to form recordable areas within a data recording layer, wherein the data recording layer is defined by a plane that is perpendicular to a thickness direction of the optical recording medium.

12. The method of claim 11, wherein illuminating one of the data recording regions comprising illuminating a selected one of the recordable areas.

* * * * *